US012269414B2

(12) United States Patent
Tanaka et al.

(10) Patent No.: US 12,269,414 B2
(45) Date of Patent: Apr. 8, 2025

(54) PASSENGER SEAT AIRBAG DEVICE

(71) Applicant: Autoliv Development AB, Vargarda (SE)

(72) Inventors: Kaname Tanaka, Kanagawa (JP); Kazuki Fujiwara, Kanagawa (JP); Kazuhiro Abe, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/695,907

(22) PCT Filed: Sep. 12, 2022

(86) PCT No.: PCT/JP2022/034083
§ 371 (c)(1),
(2) Date: Mar. 27, 2024

(87) PCT Pub. No.: WO2023/053922
PCT Pub. Date: Apr. 6, 2023

(65) Prior Publication Data
US 2024/0409057 A1    Dec. 12, 2024

(30) Foreign Application Priority Data
Oct. 1, 2021    (JP) .................................. 2021-163134

(51) Int. Cl.
*B60R 21/233*    (2006.01)
*B60R 21/205*    (2011.01)
*B60R 21/239*    (2006.01)

(52) U.S. Cl.
CPC .......... *B60R 21/233* (2013.01); *B60R 21/205* (2013.01); *B60R 21/239* (2013.01);
(Continued)

(58) Field of Classification Search
CPC ................ B60R 21/233; B60R 21/239; B60R 2021/23324; B60R 2021/2395
See application file for complete search history.

(56) References Cited

U.S. PATENT DOCUMENTS 4,262,931 A * 4/1981 Strasser ................ B60R 21/233
280/739
8,282,122 B2 * 10/2012 Marable ................ B60R 21/233
280/739
(Continued)

FOREIGN PATENT DOCUMENTS

JP    2007-161201 A    6/2007
JP    2016-40160 A    3/2016
(Continued)

*Primary Examiner* — Paul N Dickson
*Assistant Examiner* — Tiffany L Webb
(74) *Attorney, Agent, or Firm* — Foley & Lardner LLP

(57) ABSTRACT

An airbag device that is stowed in the instrument panel of a vehicle in order to protect an occupant in a passenger seat and includes an inflator for generating expansion gas along with an airbag that inflates and deploys toward the occupant side via gas released from the inflator. The airbag is connected to the inflator and includes a main chamber positioned in front of the occupant properly seated during deployment and a sub chamber connected to at least one side of the main chamber. An inner vent through which gas flows, is formed at a boundary portion of the main chamber and the sub chamber. Furthermore, a check valve for opening and closing the inner vent is provided.

12 Claims, 10 Drawing Sheets

(52) U.S. Cl.
CPC .............. *B60R 2021/23324* (2013.01); *B60R 2021/2395* (2013.01)

(56) References Cited

U.S. PATENT DOCUMENTS

| | | | | |
|---|---|---|---|---|
| 9,187,055 | B1* | 11/2015 | Genthikatti | B60R 21/233 |
| 9,358,945 | B2* | 6/2016 | Yamada | B60R 21/263 |
| 9,381,885 | B2* | 7/2016 | Anderson | B60R 21/233 |
| 9,533,652 | B1* | 1/2017 | Paxton | B60R 21/233 |
| 9,566,937 | B1* | 2/2017 | Anderson | B60R 21/235 |
| 9,580,039 | B2* | 2/2017 | Schneider | B60R 21/233 |
| 10,183,645 | B2* | 1/2019 | Rose | B60R 21/01552 |
| 10,293,777 | B2* | 5/2019 | Paxton | B60R 21/239 |
| 10,493,945 | B2* | 12/2019 | Anderson | B60R 21/239 |
| 11,292,421 | B2* | 4/2022 | Anderson | B60R 21/233 |
| 2018/0251093 | A1 | 9/2018 | Rose et al. | |
| 2019/0039557 | A1* | 2/2019 | Barnes | B60R 21/239 |

FOREIGN PATENT DOCUMENTS

| | | |
|---|---|---|
| JP | 2018-167760 A | 11/2018 |
| JP | 2020-23307 A | 2/2020 |

* cited by examiner

PASSENGER SEAT AIRBAG DEVICE

TECHNICAL FIELD

The present invention relates to a passenger seat airbag device for protecting an occupant riding in a passenger seat of a vehicle.

BACKGROUND ART

Providing one or more type of airbag in a vehicle in order to protect an occupant in the event of a vehicle accident is well known. There are various forms of airbags, including, for example, a so-called driver airbag that expands from a vicinity of a center of a steering wheel of an automobile in order to protect a driver, a passenger airbag that expands from the instrument panel in order to protect an occupant in a passenger seat, a curtain airbag that deploys downward inside a window of the automobile in order to protect the occupant in the event of an impact in the vehicle lateral direction or an overturn or rollover accident, and a side airbag that deploys from a side of a seat in order to protect the occupant in the event of an impact in the vehicle lateral direction. The present invention relates to an airbag device for a passenger seat.

Here, in the event of an oblique impact from the front of the vehicle, an occupant enters the deployed airbag at an irregular position and angle, and there are cases where the head of the occupant cannot be suitably protected. For example, there is a possibility of a phenomenon known as "bottoming out", where the head of the occupant in the passenger seat comes into contact with the airbag at a position offset from the center thereof, and pressure from the head of the occupant causes the internal pressure of the airbag to reduce and the front of the head of the occupant to impact the center display or audio panel or the like. In other words, there was a possibility of circumstances occurring where restraint of the head of the occupant is difficult.

SUMMARY OF THE INVENTION

Problem to be Solved by the Invention

The present invention was made in view of the above circumstances, and an object thereof is to provide an airbag device that can suitably restrain the head of an occupant riding in a passenger seat of a vehicle.

Means for Solving the Problem

In order to solve the aforementioned problem, the present invention is an airbag device that is stowed in the instrument panel of a vehicle in order to protect an occupant in a passenger seat and includes an inflator for generating expansion gas along with an airbag that inflates and deploys toward the occupant side via gas released from the inflator. The airbag is connected to the inflator and includes a main chamber positioned in an area in front of the occupant properly seated during deployment and a sub chamber connected to one side of the main chamber. An inner vent through which gas flows, is formed at a boundary portion of the main chamber and the sub chamber. Furthermore, a check valve for opening and closing the inner vent is provided.

Here, the "instrument panel" is in front of the front seats of the vehicle, a portion positioned below a windshield, is generally formed of resin, and also may be called a dashboard. Note that the airbag device can also be stowed inside other structural portions inside the cabin other than inside the instrument panel.

In addition, the "side part" is a concept that includes one of or both of the left and right side surfaces of the main chamber.

In addition, "boundary portion" is the portion as an area where the main chamber and sub chamber come into contact and includes not only connecting the entirety of the side surfaces of the chambers in this boundary portion by sewing or the like, but also connecting a certain area including at least around the inner vent.

Note that in the specification, claims, and drawings of the present application, "front" refers to the front (in the traveling direction) of a vehicle, "rear" refers to the rear (opposite the traveling direction) of the vehicle, "right" refers to the right side in the traveling direction, "left" refers to the left side in the traveling direction, and "vehicle width direction" refers to the left-to-right direction.

With the present invention described above, when an event such as a vehicle collision occurs, expansion gas generated from the inflator flows into the main chamber of the airbag and thereafter reaches the sub chamber through the inner vent, causing the airbag to expand and deploy. Here, if the occupant of the passenger seat enters the sub chamber due to an oblique collision of the vehicle, gas pressure inside the sub chamber rises, causing the check valve to close the inner vent, which enables maintaining pressure in the sub chamber and suitable restraint of the occupant that entered the sub chamber.

The sub chamber can be provided toward the center side (drivers seat side) of the vehicle relative to the main chamber. This reliably ensures avoiding contact between the occupant seated in the passenger seat with the center console, instrument panel, driver, or the like due to the impact of a collision.

The check valve may be composed of a flexible textile member arranged so as to cover the inner vent. The textile member may use the same fabric as the fabric for forming the airbag. Forming the check valve with a textile member enables simplifying the structure of the check valve and suppressing increase in manufacturing cost to a minimum.

The volume of the sub chamber is preferably set smaller than the volume of the main chamber. In the case of a frontal collision, this enables reliable restraint of the occupant by the large volume main chamber.

The main chamber and the sub chamber can each be molded as independent and separate bags. The inner vent is composed of an opening formed in both chambers at a portion where the main chamber and sub chamber come into contact.

The main chamber and sub chamber can be formed by providing a partition panel inside a single airbag and the inner vent can be formed in the partition panel.

The sub chamber can be formed of a base material with the periphery thereof connected to the side surface of the main chamber. Here, the inner vent is formed in the side surface of the main chamber.

Vent holes for exhausting gas externally are preferably formed in the main chamber.

In addition to providing a closeable inner vent in the sub chamber, forming vent holes in the main chamber causes pressure of the main chamber to gradually decrease when an occupant comes into contact with the sub chamber, though pressure in the sub chamber rises. Therefore, with maintained pressure, the sub chamber more readily moves toward or becomes inclined toward the main chamber which has become more flexible due to gas exhaustion. As a result, the sub chamber does not escape to the outside (side opposite the main chamber), enabling reliable restraint of the head of the occupant.

The sub chamber may be configured so as to have a roughly triangular shape when a deployed state thereof is observed from above.

Here, a "roughly triangular shape" is not limited to a strict triangular shape but includes a shape with three sides where the corners may be slightly rounded or slightly chamfered.

The triangular shape may be composed of a first side facing the occupant, a second side positioned at a boundary portion with the main chamber, and a third side forming a side part of the airbag.

The second side of the sub chamber is positioned on a portion of the boundary with the main chamber so that the occupant enters the surface (occupant side) corresponding to the first side of the sub chamber, and the force received by the sub chamber can be absorbed by the main chamber.

The length of the first side may be formed shorter than the length of the second side. Thus the width of the sub chamber in the left-to-right direction is shorter than the depth in the front-to-back direction when deployed.

The surface that forms the first side of the sub chamber and a surface of the main chamber that faces the occupant may be configured so as to, in general, form the same surface.

The front end of the sub chamber may be configured so as to be positioned behind the front end of the main chamber.

The sub chamber may be configured so as to connect to only one side of the main chamber. For example, the sub chamber may be configured so as to connect to the vehicle interior side of the main chamber. Alternatively, the sub chamber may be connected to the vehicle exterior side (window side) of the main chamber.

Furthermore, a sub chamber may be provided on both left and right sides of the main chamber. In this case, the head of the occupant can be suitably restrained regardless of the direction (offset angle) of the vehicle collision.

DESCRIPTION OF THE PREFERRED EMBODIMENTS

Passenger seat airbag devices according to examples of the present invention are described in detail below based on the accompanying drawings. Note that in the present embodiment, while an occupant P is based on an experimental dummy, it goes without saying that the same functions will be achieved with an actual occupant (human).

Embodiment 1

Figure 1:
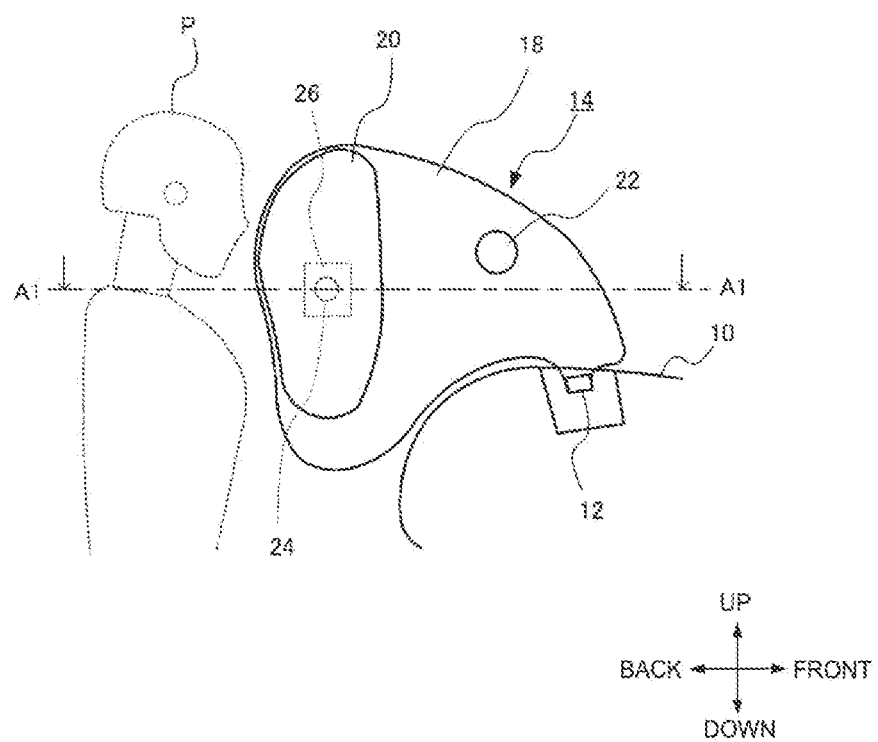
FIG. 1 is a side view depicting a deployed state of the airbag according to the present invention.
Figure 2:
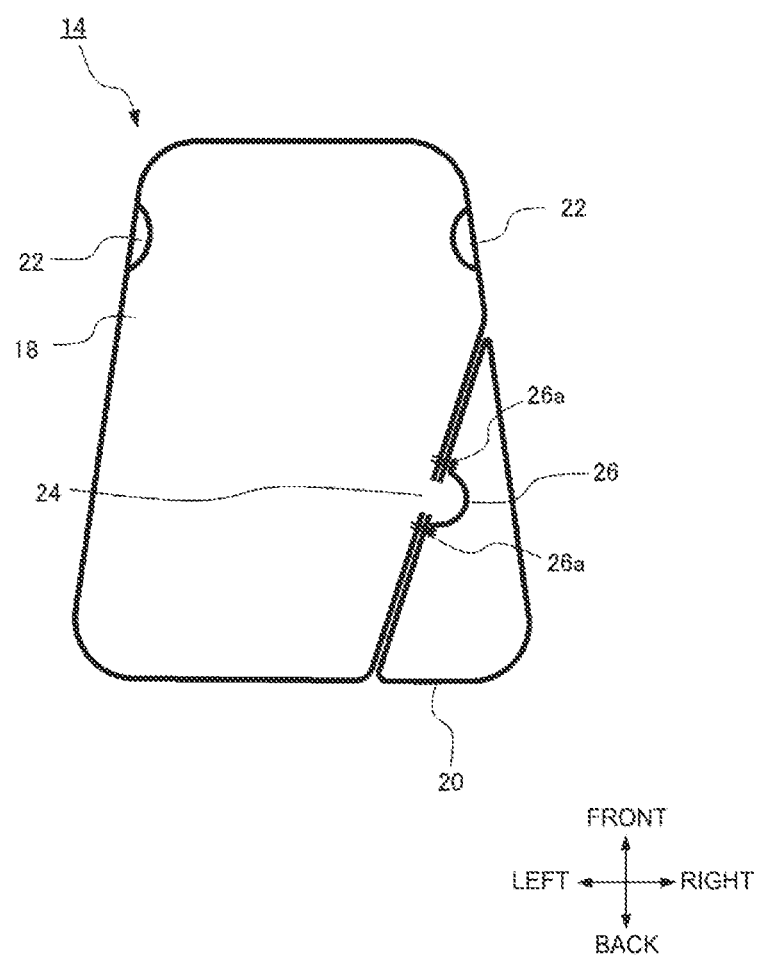
FIG. 2 corresponds to a cross section in the A1-A1 direction of FIG. 1 depicting a deployed state of an airbag according to Embodiment 1 of the present invention.
Figure 3:
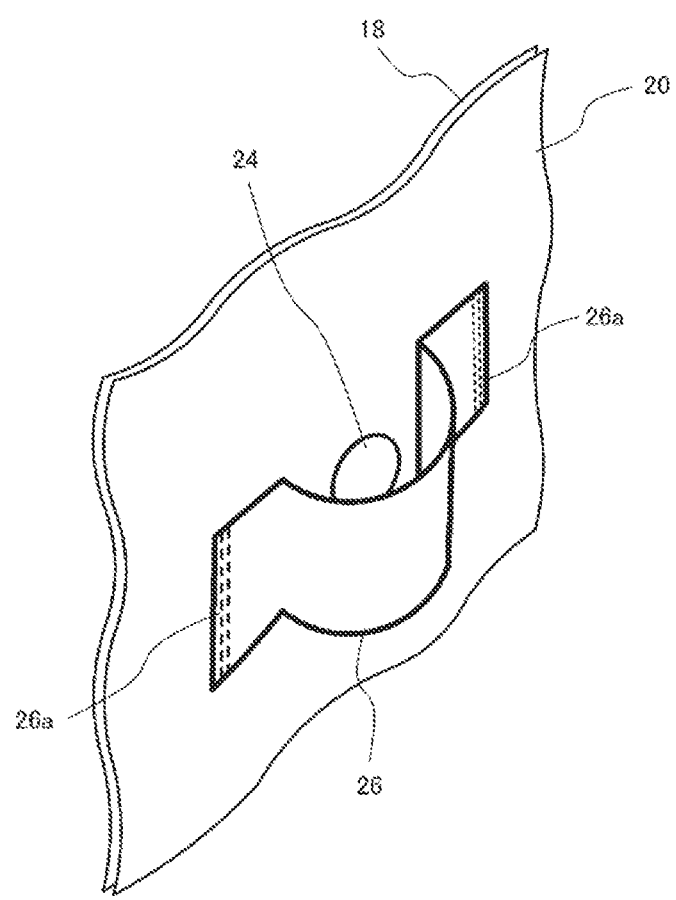
FIG. 3 is a perspective view with important parts of FIG. 2 enlarged.

FIG. 1 is a side view illustrating the deployed state of an airbag 14 of a passenger seat airbag device according to Embodiment 1 of the present invention. FIG. 2 is a cross section view in the A1-A1 direction of FIG. 1 depicting a deployed state of airbag 14. FIG. 3 is a perspective view with important parts (near inner vent) of FIG. 2 enlarged.

The airbag device according to the present embodiment is stowed in the instrument panel 10 of a vehicle in order to protect an occupant P in a passenger seat, and includes an inflator 12 for generating expansion gas along with an airbag 14 that expands and deploys toward the occupant P side via gas released from the inflator 12.

The airbag 14 communicates with the inflator 12 and includes a main chamber 18 that deploys to the front of a normally seated occupant P and a sub chamber 20 connected to the side of the main chamber 18 at the center of the vehicle (right side in the present embodiment). An inner vent 24 is formed at the boundary portion of the main chamber 18 and sub chamber 20 through which gas flows and further, a check valve 26 is provided that can open and close the inner vent 24.

The main chamber 18 and sub chamber 20 are connected by sewing at the boundary portion thereof. The sewn area includes at least around the inner vent 24 but other areas may also be sewn.

As depicted in FIG. 1, vent holes 22 are formed in both left and right sides of the main chamber 18 for discharging gas from inside the main chamber 18.

As depicted in FIG. 2, the main chamber 18 and the sub chamber 20 are formed as separate and distinct bags.

As depicted in FIG. 2 and FIG. 3, the inner vent 24 is composed of an opening formed in both the main chamber 18 and the sub chamber 20 at the portion where the chambers come into contact.

The check valve 26 is a flexible textile member arranged so as to cover the inner vent 24 and can be, for example, formed from the same fabric as the fabric the airbag 14 is formed from. An end part 26a of the check valve 26 is connected to an inner surface of the sub chamber 20 by sewing. The inner vent 24 is opened by the check valve 26 protruding toward the inside of the sub chamber 20 due to gas flowing from the main chamber 18 to the sub chamber 20. On the other hand, the check valve 26 is configured to close the inner vent 24 by coming into contact with the inner surface of the sub chamber 20 if the inner pressure in the sub chamber 20 rises.

The volume of the sub chamber 20 is set smaller than the volume of the main chamber 18. For example, the volume of sub chamber 20 can be set to 10 to 20% of the volume of main chamber 18.

Figure 4:
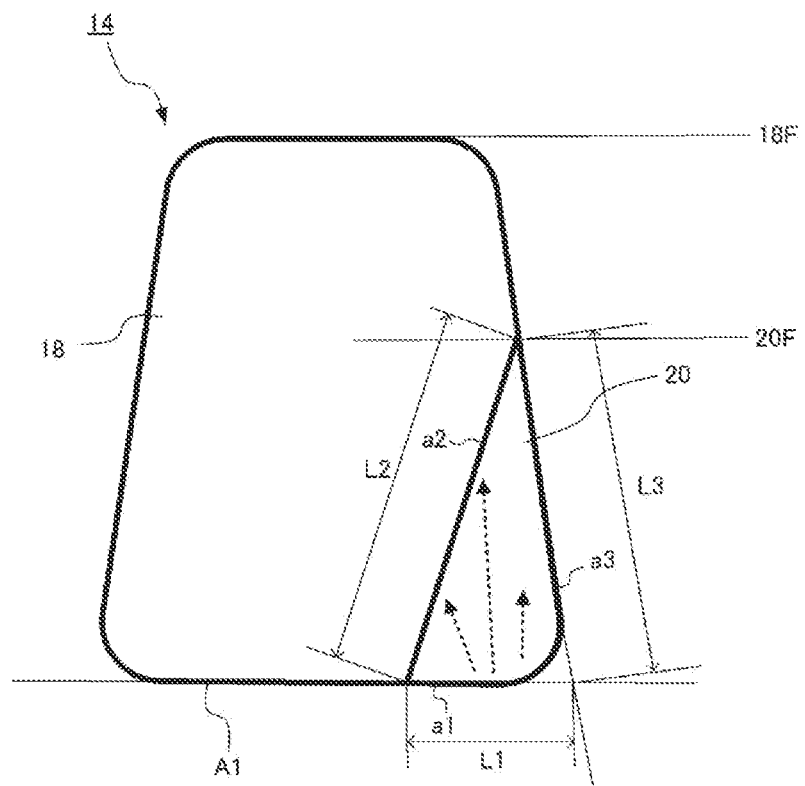
FIG. 4 is an explanatory diagram of airbag dimensions (shape, dimensional ratio and the like) schematically depicting the airbag according to the present invention in a deployed state.
Figure 4:
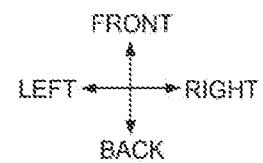

FIG. 4 is an explanatory diagram of airbag 14 dimensions (shape, dimensional ratio and the like) schematically depicting the airbag according to the present invention in a deployed state.

The sub chamber 20 is configured so as to have a roughly triangular shape when a deployed state thereof is observed from above. Here, a "roughly triangular shape" is not limited to a strict triangular shape but includes a shape with three sides where the corners may be slightly rounded or slightly chamfered.

As depicted in FIG. 4, the triangular shape of the sub chamber 20 as viewed from above includes a first side a1 facing the occupant, a second side a2 positioned at a boundary portion with the main chamber 18, and a third side a3 that forms a part of the vehicle center side part (right side part) of the airbag 14.

With the present invention, the second side a2 of the sub chamber 20 is positioned on a portion of the boundary with the main chamber 18 so as the occupant enters the surface (occupant side) corresponding to the first side a1 of the sub chamber 20, the force received by the sub chamber 20 can be absorbed by the main chamber 18.

The length L1 of the first side a1 is shorter than the length L2 of the second side a2 and when deployed, the width (L1) in the left-to-right direction of the sub chamber 20 is shorter than the depth in the front-to-back direction.

The surface that forms the first side a1 of the sub chamber 20 and a surface A1 of the main chamber 18 that faces the occupant are configured so as to, in general, form the same surface.

In addition, a front end 20F of the sub chamber 20 is configured so as to be positioned to the rear of a front end 18F of the main chamber 18.

Operation of the Present Invention

Figure 5:
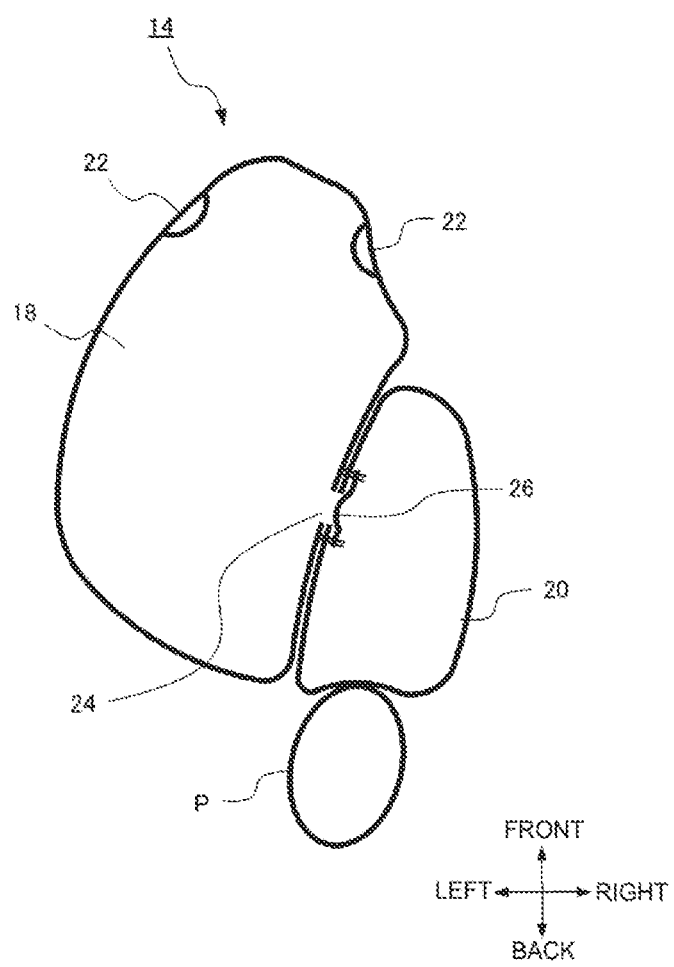
FIG. 5 is a cross section view depicting the deployed state of the airbag according to Embodiment 1 of the present invention, depicting an occupant having entered a sub chamber.
Figure 6:
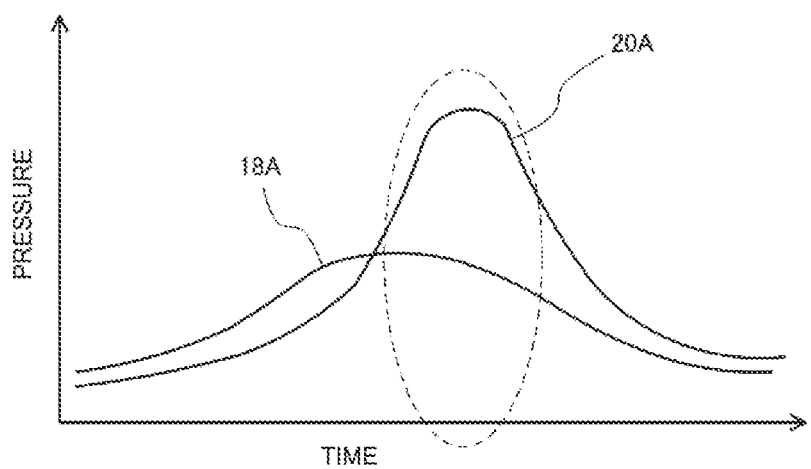
FIG. 6 is a graph depicting pressure fluctuations of the airbag according to the present invention.

FIG. 5 is a cross section view depicting the deployed state of the passenger seat airbag 14 according to Embodiment 1 of the present invention, depicting the occupant P having entered the sub chamber 20. FIG. 6 is a graph depicting internal pressure fluctuations of the main chamber 18 and the sub chamber 20, where 18A depicts the internal pressure of the main chamber 18 and 20A depicts the internal pressure of the sub chamber 20.

When an event such as a collision occurs, expansion gas generated from the inflator 12 flows into the main chamber 18 of the airbag 14 and thereafter flows into the sub chamber 20 via the inner vent 24. Here, the check valve 26 provided in the sub chamber 20 is in a swollen state toward the sub chamber 20 side by pressure of gas flowing from the main chamber 18; therefore, gas rapidly flows through the inner vent 24 into the sub chamber 20 (see FIG. 2).

On the other hand, as depicted in FIG. 5, if the passenger side occupant P enters the sub chamber 20 due to an oblique collision of the vehicle, gas pressure in the sub chamber 20 rises, and the inner vent 24 is blocked by the check valve 26, causing high pressure to be maintained in the sub chamber 20. This type of state corresponds to the portion depicted as dashed lines on FIG. 6.

As described above, when the occupant P comes into contact with the sub chamber 20, the pressure in the sub chamber 20 rises but the pressure in the main chamber 18 gradually decreases. Therefore, with maintained pressure, the sub chamber 20 more readily moves toward or becomes inclined toward the main chamber 18 which has become more flexible due to gas exhaustion. As a result, the sub chamber 20 does not escape to the outside (side opposite the main chamber 18), enabling reliable restraint of the head of the occupant P.

Embodiment 2

Figure 7:
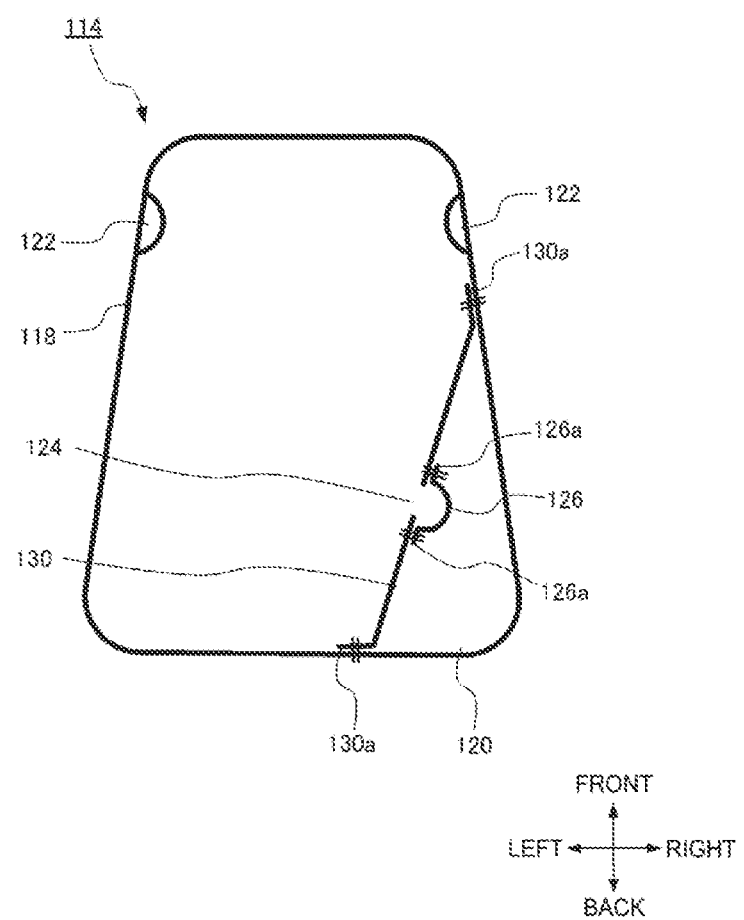
FIG. 7 corresponds to a cross section in the A1-A1 direction of FIG. 1 depicting a deployed state of an airbag according to Embodiment 2 of the present invention.

FIG. 7 corresponds to a cross section in the A1-A1 direction of FIG. 1 depicting the deployed state of an airbag 114 according to Embodiment 2 of the present invention.

While in Embodiment 1 described above, the main chamber 18 and sub chamber 20 that constituted the airbag 14 were each composed of independent and separate bags, in the present embodiment, a main chamber 118 and sub chamber 120 are formed by providing a partition panel 130 inside a single airbag (114).

Together with forming of an inner vent 124, a check valve 126 is provided in the partition panel 130. The functions of the inner vent 124 and the check valve 126 are the same as in Embodiment 1.

The front and rear end parts 130a of the partition panel 130 are connected to the inner surface of the airbag by sewing. In addition, an end part 126a of the check valve 126 is connected to a surface on the sub chamber 120 side of the partition panel 130 by sewing.

Similar to Embodiment 1, a vent hole 122 is formed in two locations on the outer surface of the main chamber 118.

Embodiment 2 is configured by providing a partition panel 130 inside a single airbag so the structure is simple compared to that of Embodiment 1; therefore, manufacturing processes can be expected to be simplified.

Embodiment 3

Figure 8:
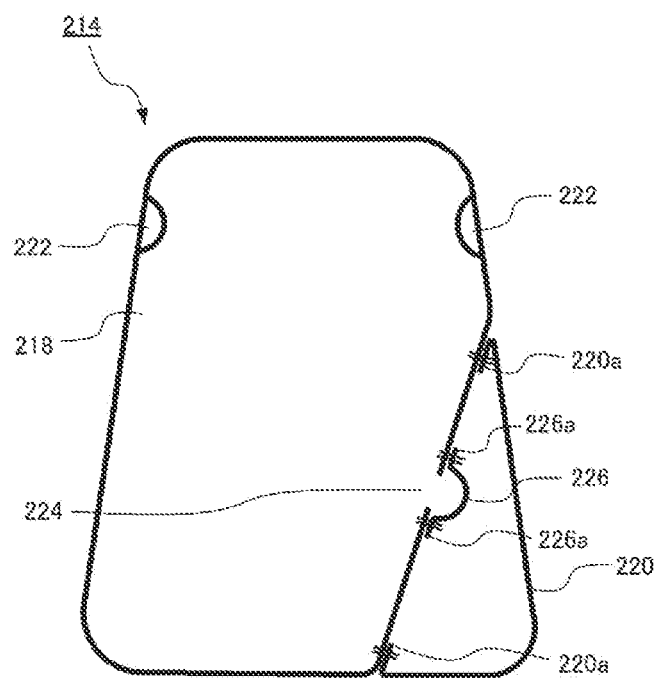
FIG. 8 corresponds to a cross section in the A1-A1 direction of FIG. 1 depicting the deployed state of an airbag according to Embodiment 3 of the present invention.
Figure 8:
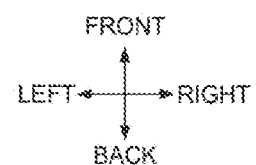

FIG. 8 corresponds to a cross section in the A1-A1 direction of FIG. 1 depicting the deployed state of an airbag 214 according to Embodiment 3 of the present invention.

While in Embodiment 1 described above, the main chamber 18 and the sub chamber 20 that constituted the airbag 14 were composed of independent and separate bags, in the present embodiment, a sub chamber 220 is formed by sewing a base material onto a side surface of a main chamber 218. In other words, the sub chamber 220 is formed by sewing an outer periphery 220a of the base material for the sub chamber to the side of the main chamber 218.

An inner vent 224 connecting to the sub chamber 220 is formed in the main chamber 218 and a check valve 226 is provided so as to cover this inner vent 224. The fundamental functions of the inner vent 224 and the check valve 226 are the same as in Embodiment 1.

An end part 226a of the check valve 226 is connected to a side surface of the main chamber 218 by sewing. In addition, similar to Embodiment 1, a vent hole 222 is formed in two locations on the outer surface of the main chamber 218.

Embodiment 4

Figure 9:
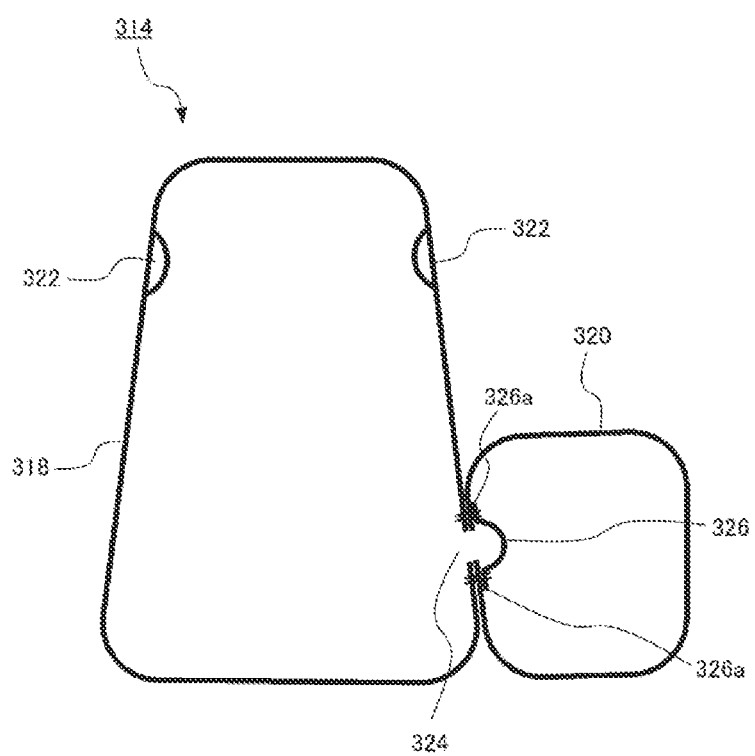
FIG. 9 corresponds to a cross section in the A1-A1 direction of FIG. 1 depicting the deployed state of an airbag according to Embodiment 4 of the present invention.
Figure 9:
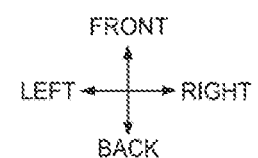

FIG. 9 corresponds to a cross section in the A1-A1 direction of FIG. 1 depicting the deployed state of an airbag 314 according to Embodiment 4 of the present invention.

In Embodiments 1 to 3 described above, the upper surface shape of the sub chambers (20, 120, 220) were roughly triangular shaped but a sub chamber 320 used for the present embodiment is roughly square shaped. The configuration other than shape of the sub chamber is the same as Embodiment 1 and overlapping description will be omitted.

Similar to Embodiment 1, a vent hole 322 is formed in two locations on the outer surface of a main chamber 318.

The sub chambers 20, 120, 220, 320 used in Embodiments 1 to 4 were only connected to the main chambers 18, 118, 218, 318 on one side and here, the sub chambers 20, 120, 220, 320 are preferably connected to the main chambers 18, 118, 218, 318 on the vehicle interior side (vehicle center side: far side). This is because curtain airbags are normally deployed to the vehicle exterior side (vehicle door side: near side) so there is significant need for protecting the head on the vehicle interior side where there are no curtain airbags.

Embodiment 5

Figure 10:
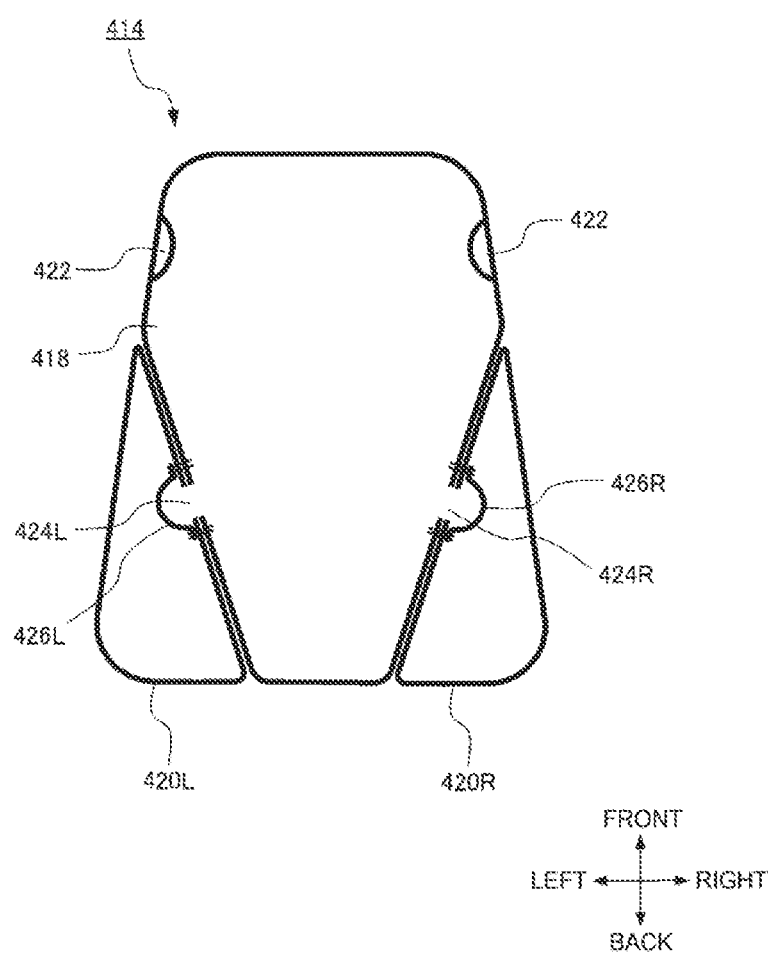
FIG. 10 corresponds to a cross section in the A1-A1 direction of FIG. 1 depicting the deployed state of an airbag according to Embodiment 5 of the present invention.

FIG. 10 corresponds to a cross section in the A1-A1 direction of FIG. 1 depicting the deployed state of an airbag 414 according to Embodiment 5 of the present invention.

In Embodiment 1 described above, the sub chamber 20 was provided on one side of the main chamber 18 that constituted the airbag 14, whereas the present embodiment is configured with sub chambers 420L and 420R connected to both left and right sides of a main chamber 418. Note that otherwise the structure is basically the same as that of Embodiment 1 and overlapping descriptions are omitted. In addition, in Embodiment 2 to Embodiment 4, a structure of connecting sub chambers on both left and right sides of the main chamber as in the present embodiment can be adopted.

As depicted in FIG. 10, vent holes 422 are formed in two locations on the outer surface of the main chamber 418. Inner vents 424L and 424R are formed by openings formed in both chambers at the portions where the main chamber 418 comes into contact with the sub chambers 420L and 420R. Check valves 426L and 426R are provided so as to cover the inner vents 424L and 424R. Furthermore, the inner vents 424L and 424R where the check valves 426L and 426R protrude inside the sub chambers 420L and 420R are opened by gas flowing from the main chamber 418 into the sub chambers 420L and 420R On the other hand, the check valves 426L and 426R are configured to come into close contact with the inner surface of the sub chambers 420L and 420R and close the inner vents 424L and 424R when internal pressure in the sub chambers 420L and 420R rises.

In the present embodiment, when a vehicle collision event occurs, expansion gas generated by the inflator 12 flows into the main chamber 418 and thereafter flows through the inner vents 424L and 420R and flows into the sub chambers 426L and 426R [sic]. Here, the check valves 426L and 426R provided inside the sub chambers 420L and 420R are in a swollen state in the sub chambers 420L and 420R due to pressure of gas flowing from the main chamber 418 causing gas to rapidly flow through the inner vents 424L and 424R into the sub chambers 420L and 420R.

On the other hand, if the occupant of the passenger seat enters one of the left or right sub chambers, for example, the left sub chamber 420L due to a vehicle oblique collision, the gas pressure inside the sub chamber 420L the occupant entered rises, the inner vent 424L is closed by the check valve 426L, and pressure of the sub chamber 420L is maintained at a high state. Here, the sub chamber 420R on the opposite side acts as part of the main chamber 420 due to no increase in internal pressure therein and thereby the check valve 426R maintaining an open state. In other words the internal pressure of the main chamber 418 and sub chamber 420R will gradually decrease. Therefore, with maintained pressure, the sub chamber 420L more readily moves toward or becomes inclined toward the main chamber 418 and sub chamber 420R which have become more flexible due to gas exhaustion. As a result, the sub chamber 420L does not escape to the outside (side opposite the main chamber 418), enabling reliable restraint of the head of the occupant. This same (opposite left-to-right) behavior occurs in the case the occupant enters the sub chamber 420R.

Note that in FIG. 10, the sub chambers 420L and 420R are arranged and molded symmetrically left-to-right but can have different shapes, sizes, or arrangements left-to-right. For example, the volume of the sub chamber on the far side of the vehicle can be made large and that of the near side can be made small. Thereby, the larger sub chamber on the far side can reliably protect the head of the occupant. On the other hand, the sub chamber and curtain airbag on the near side can reliably protect the head of the occupant.

Interpretation of the Technical Scope of the Present Invention

Examples of the present invention have been described above; however, the present invention is not limited in any way to the examples described above and can be changed as appropriate within the scope of the technical idea as that defined in the patent claims.

The invention claimed is:

1. An airbag device stowed in an instrument panel of a vehicle to protect an occupant in a passenger seat, the airbag device comprising:
    an inflator for generating expansion gas; and
    an airbag connected to the inflator that expands and deploys toward an occupant side by gas released from the inflator, the airbag including:
        a main chamber positioned in an area including the corresponding to a front of an occupant properly seated during deployment of the airbag;
        a sub chamber connected to at least one side surface of the main chamber, the sub chamber, when deployed and viewed from above, forming a roughly triangular shape including a first side on the occupant side, a second side at a boundary portion with the main chamber, and a third side forming a side part of the airbag, wherein a surface of the main chamber and the first side form generally a same impact surface;
        an inner vent through which gas flows formed in the boundary portion of the main chamber and the sub chamber; and
        a check valve for opening and closing the inner vent.

2. The airbag device according to claim 1, wherein the check valve acts to close the inner vent when the pressure inside the sub chamber rises.

3. The airbag device according to claim 1, wherein the check valve is a flexible textile member arranged so as to cover the inner vent.

4. The airbag device according to claim 1, wherein the volume of the sub chamber is set smaller than the volume of the main chamber.

5. The airbag device according to claim 1, wherein the main chamber and the sub chamber are each molded as independent and separate bags.

6. The airbag device according to claim 1, wherein the main chamber and sub chamber are formed by providing a partition panel inside a single airbag and the inner vent is formed in the partition panel.

7. The airbag device according to claim 1, wherein the sub chamber is formed of base material connected to the side surface of the main chamber.

8. The airbag device according to claim 7, wherein the inner vent is formed in the side surface of the main chamber.

9. The airbag device according to claim 1, wherein external vents for exhausting gas externally are formed in the main chamber.

10. The airbag device according to claim 1, wherein the length of the first side is shorter than the length of the second side.

11. The airbag device according to claim 1, wherein the front end of the sub chamber is configured so as to be positioned more rearward than a front end of the main chamber.

12. The airbag device according to claim 1, wherein the sub chamber is connected to both left and right side surfaces of the main chamber.

* * * * *